(12) United States Patent
Fox et al.

(10) Patent No.: US 7,295,771 B2
(45) Date of Patent: Nov. 13, 2007

(54) METHOD AND APPARATUS FOR MINIMIZING AMBIENT ILLUMINATION EFFECTS IN A VISION SYSTEM

(75) Inventors: Stephen H. Fox, Kokomo, IN (US); Jeffrey M. Brown, Terre Haute, IN (US)

(73) Assignee: Delphi Technologies, Inc., Troy, MI (US)

( * ) Notice: Subject to any disclaimer, the term of this patent is extended or adjusted under 35 U.S.C. 154(b) by 375 days.

(21) Appl. No.: 11/113,521

(22) Filed: Apr. 25, 2005

(65) Prior Publication Data

US 2006/0238714 A1 Oct. 26, 2006

(51) Int. Cl.
G03B 15/03 (2006.01)
H04N 7/18 (2006.01)
H04N 5/243 (2006.01)
(52) U.S. Cl. .................. 396/155; 348/148; 348/370
(58) Field of Classification Search .......... 396/98, 396/155, 429; 348/148, 370, 371; 382/274
See application file for complete search history.

(56) References Cited

U.S. PATENT DOCUMENTS 6,289,107 B1 * 9/2001 Borchers et al. ............ 382/100

2003/0179083 A1 * 9/2003 Wallace et al. ............ 340/426.1

OTHER PUBLICATIONS

Sohail Nadimi and Bir Bhanu, Centoer for Research in Intelligent Systems University of California, Riverside, California, 92521, Moving Shadow Detection Using a Physics-based Approach, 4 pages. 2002 IEEE.

(Continued)

Primary Examiner—W. B. Perkey
Assistant Examiner—Rishi S. Suthar
(74) Attorney, Agent, or Firm—Jimmy L. Funke

(57) ABSTRACT

Video components attributable to ambient lighting in a stream of digital images of a scene illuminated by both ambient and active sources are eliminated in each image frame, leaving only video components attributable to the active source. The spectrum of the active source is encompassed by the ambient source, and spectral filtering defines a primary channel comprising video components in a primary spectrum encompassing both active and ambient lighting and a secondary channel comprising video components in a secondary spectrum encompassing only ambient lighting. The pixels of the secondary channel are scaled by a factor correlating the spectral reflectances of the primary and secondary spectra, and the scaled secondary channel is subtracted from the primary channel to produce an ambient corrected image. The pixels of the ambient corrected image are further scaled to compensate for spectral filter bleeding of the active source into the secondary channel.

10 Claims, 2 Drawing Sheets

OTHER PUBLICATIONS

Gareth Funka-Iea Siemens Corp. Research, 755 College Rd. East, Princeton, NJ 08540, Ruzena Bajcsy, Grasp Lab. Dept. of Computer and Info. Science, University Of Pennsylvanin, Philadelphia, PA 19104, Combining Color and Geometry for the active, Visual Recognition of Shadows, 7 pages, 1995 IEEE.

P. Gamba, & M. Lilla,. Department of Electronics, University of Pavia, Pavia, Italy, A. Mecocci, Faculty of Engineering, University of Siena, Siena, Italy, A Fast Algorithm for Target Shadow Removal in a Monocular Colour Sequences, 4 pages, 1997 IEEE.

Carol L. Novak and Steven A. Shafer, School of Computer Science, Carnegie Mellon University, Pittsburgh, PA 15213, Anatomy of a Color Histogram, 7 pages, 1992 IEEE.

GG Sexton, X Zhang, University of Northumbria Newcastle, Suppression Of Shadows For Imporved Object Dicrimination, , 6 pages, 1993 The Institution of Electrical Engineers.

Gudrun J. Klinker, Steven A. Shafer, Takeo Kanade, Computer Science Department, Carnegie-Mellon Univeristy, Pittsburgh, PA 15213,Color Image Analysis With an Intrinsic Reflection Model, 5, pages, 1998 IEEE.

R. Cucchiara, C. Grana, M. Piccardi, A. Prati, D.S.I.—University of Modena and Reggio Emilia, via Vignolese 905-41000 Modena, Italy , Detecting Objects, Shadows and Ghosts in Video Streams by Exploiting Color and Motion Information, 6 pages, 2001 IEEE.

* cited by examiner

METHOD AND APPARATUS FOR MINIMIZING AMBIENT ILLUMINATION EFFECTS IN A VISION SYSTEM

TECHNICAL FIELD

The present invention relates to the use of a vision system in an environment including both active and ambient lighting, and more particularly to a technique for minimizing the effects of the ambient lighting in image data produced by the vision system.

BACKGROUND OF THE INVENTION

Digital camera based vision systems have been installed in automotive passenger compartments for various safety-related purposes such as identifying the presence and position of passengers, and determining the driver's state of awareness. Such systems include active light sources to ensure that the objects of interest are adequately illuminated, and the light impinging on the camera chip includes reflected components of both active and ambient light sources. While ambient lighting (solar and otherwise) increases illumination of objects in the passenger compartment, it is subject to drastic and unpredictable variation, and usually produces undesired shadowing due to non-uniform illumination of any given object of interest. Clearly, vision system performance in the automotive environment could be improved by somehow minimizing or eliminating the effects of ambient lighting.

Various techniques have been devised for minimizing the effects of ambient lighting in active illumination vision systems, but not without significant cost and/or performance penalties. For example, the active light source can be restricted in wavelength to a range in which sunlight is strongly absorbed by the atmosphere, making the vision system essentially insensitive to solar ambient illumination. However, silicon-based camera chips are relatively insensitive to light in that wavelength range, and significant cost penalties are incurred in compensating for the reduced sensitivity. Another technique involves pulsing the active light source so that alternate video frames are influenced only by ambient lighting; the effects of ambient lighting are eliminated by subtracting the ambient-only data from the combined illumination data. However, this technique incurs significant performance penalties by halving the frame rate and by introducing blurring artifacts if the objects of interest are in motion. What is desired is way of minimizing the effects of ambient lighting without incurring such penalties.

SUMMARY OF THE INVENTION

The present invention is directed to an improved method and apparatus for rendering a stream of video image frames of a scene illuminated by both active and ambient light sources, where video components attributable to the ambient lighting are eliminated in each image frame, leaving only video components attributable to the active light source. The active light source illuminates the scene with light in a spectrum that is encompassed by the ambient lighting, and spectral filtering is employed to form a primary channel comprising video components in a primary spectrum encompassing both active and ambient lighting and a secondary channel comprising video components in a secondary spectrum encompassing only ambient lighting. The pixels of the secondary channel are scaled by a factor correlating the spectral reflectances of the primary and secondary spectra, and the scaled secondary channel is subtracted from the primary channel to produce an ambient corrected image. The pixels of the ambient corrected image are further scaled to compensate for spectral filter bleeding between the primary and secondary spectra.

DESCRIPTION OF THE PREFERRED EMBODIMENT

Figure 1:
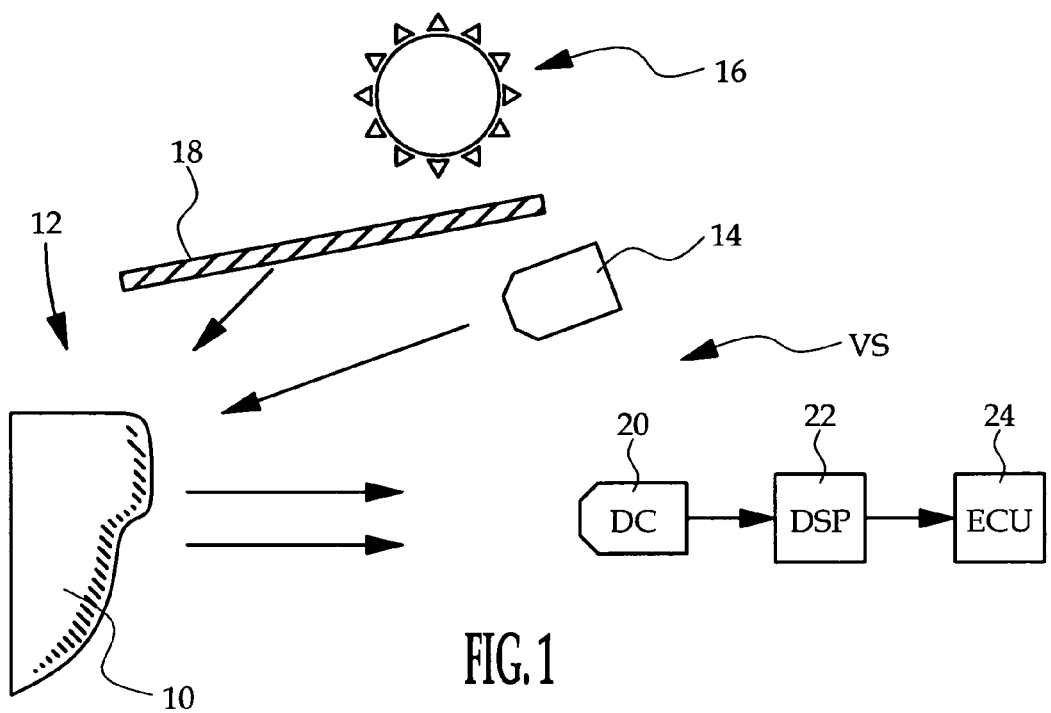
FIG. 1 is a diagram of a prior art automotive vision system.

While the present invention may be applied to vision systems in any environment where the imaged scene is illuminated by both active and ambient light sources, it is disclosed herein in the context of a motor vehicle where objects of interest in the vehicle passenger compartment are imaged and analyzed for various purposes. Referring to FIG. 1, an object 10 in a passenger compartment 12 is illuminated by both an active light source 14 and an ambient light source, as designated by the sun 16. The active light source 14 may be one or more light-emitting-diodes that emit light in a visible or near-infrared wavelength band from a location such as in the compartment headliner or the interior rear-view mirror. The ambient light source may be solar as indicated, or may emanate from other sources such as roadside lights, and typically enters the compartment 12 through a window 18.

A prior art vision system VS includes the active light source 14, a digital camera (DC) 20, a digital signal processor (DSP) 22, and an electronic control unit (ECU) 24. Active and ambient light reflected from object 10 is detected and imaged by digital camera 20, which typically includes an imaging lens and silicon imaging sensor or camera chip. The camera chip is a multi-pixel array that produces a stream of video image frames based on the impinging light content and any internal filtering, and creates an image of interest for ECU 24. The DSP 22 typically functions to identify items of interest in the imaged scene, such as occupants or certain facial features of occupants, and ECU 24 makes various determinations based on the information supplied to it by DSP 22. For example, DSP 22 and ECU 24 can be programmed to characterize an occupant, to determine the position of an occupant relative to an air bag deployment zone or to identify specified occupant characteristics associated with driver drowsiness or incapacitation.

Regardless of the vision system functionality, the ambient light entering the compartment 12 causes numerous problems due to its variability and unpredictability as mentioned above. The present invention is directed to a technique carried out by various optical and/or electronic components of a vision system subject to both ambient and active lighting for minimizing or eliminating the effects of ambient lighting. The technique of the present invention may be characterized as either a method or an apparatus, and advantageously eliminates the effects of ambient lighting in each image frame produced by the digital camera, leaving only video components attributable to the active light source.

Unlike some prior art compensation techniques, a system according to the present invention utilizes the optimal wavelength range of the camera chip, and imposes only a minor impact on its maximum frame rate.

Figure 2:
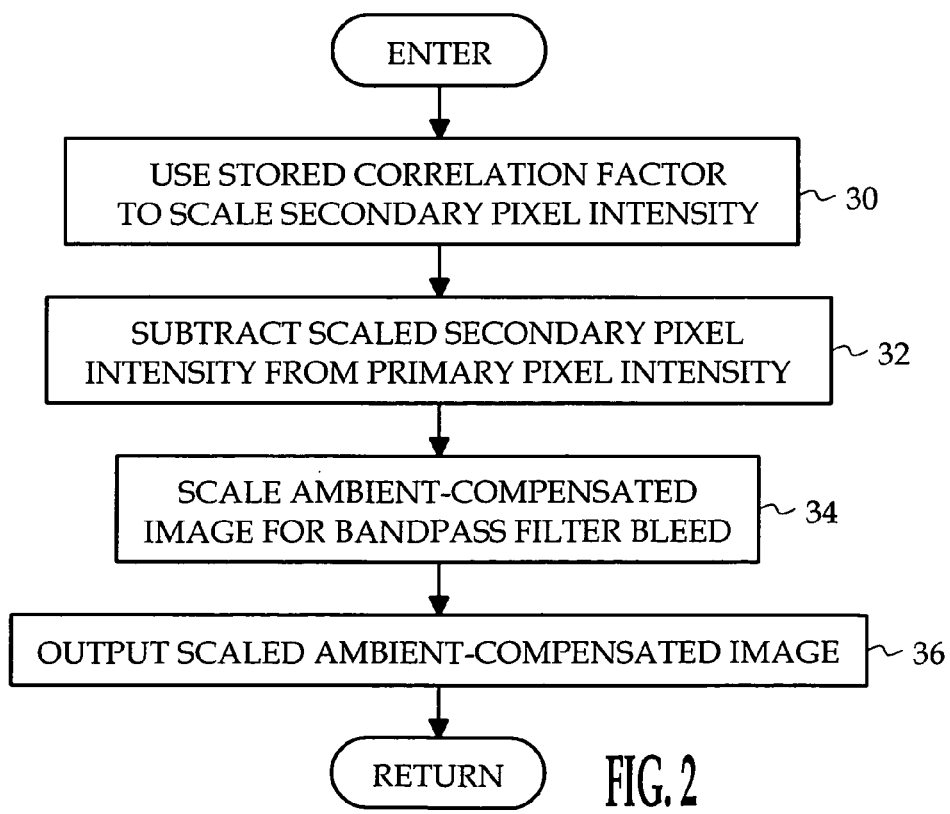
FIG. 2 is a flow diagram representing processing steps carried out by the digital signal processor of FIG. 1 according to this invention.

According to the present invention, the active light source 14 illuminates object 10 with light in a narrow spectrum (in the near-infrared spectrum, for example) that is encompassed by the ambient lighting, and spectral filtering is employed to split each video image frame into two channels: a primary channel and a secondary channel. The primary channel comprises video components in a primary spectrum encompassing both active and ambient lighting, while the secondary channel comprises video components in a secondary spectrum encompassing only ambient lighting. The primary and secondary spectra are preferably closely spaced for maximum reflectance correlation, but spectrally orthogonal for ease of filtering. For example, if the active light source emits light having a wavelength of 850 nm, the primary wavelength band may be 840 nm-860 nm, and the secondary wavelength band may be 800 nm-820 nm. Or, edge filters may be employed so that 860 nm and below represents the primary, while 870 nm and above represents the secondary channel. Or, the primary channel may remain unfiltered, while the secondary channel is filtered with a notch filter to eliminate the contribution of the active illumination to the secondary channel. A correlation factor describing the differential spectral reflectivity of ambient light for the primary and secondary channels is applied to the secondary channel pixels to determine how much of the primary channel pixel intensity is due solely to ambient lighting. While the degree of reflectivity widely varies between different objects in a given environment, the ratio of received light power at the primary and secondary wavelengths for various objects (i.e., the aforementioned correlation factor) is substantially constant for any given environment. Thus, scaling the secondary channel pixels with the correlation factor reveals what portion of the primary channel pixel intensity is due to ambient lighting. Once the secondary channel pixels are scaled with the correlation factor, the scaled pixel intensities are subtracted from the corresponding pixel intensities of the primary channel to produce an image frame in which the pixel intensities are due solely to reflections of the active light source 14. The pixels of this ambient-corrected image frame can be further scaled to compensate for spectral filter bleeding between the primary and secondary channels. Obviously, the array of pixels and the accompanying spectral filters may be arranged in a regular pattern and interpolation used to estimate primary and secondary channel intensities at every pixel site in the regular array. The result is an ambient-compensated image frame that can be used by ECU 24 for any of a number of vehicle-related or occupant-related applications. The steps of the above-described process are depicted by the flow diagram blocks 30, 32, 34 and 36 of FIG. 2, which may be considered to represent the functionality of a software routine executed by DSP 22 for each video image frame produced by digital camera 20, for example.

Figure 3:
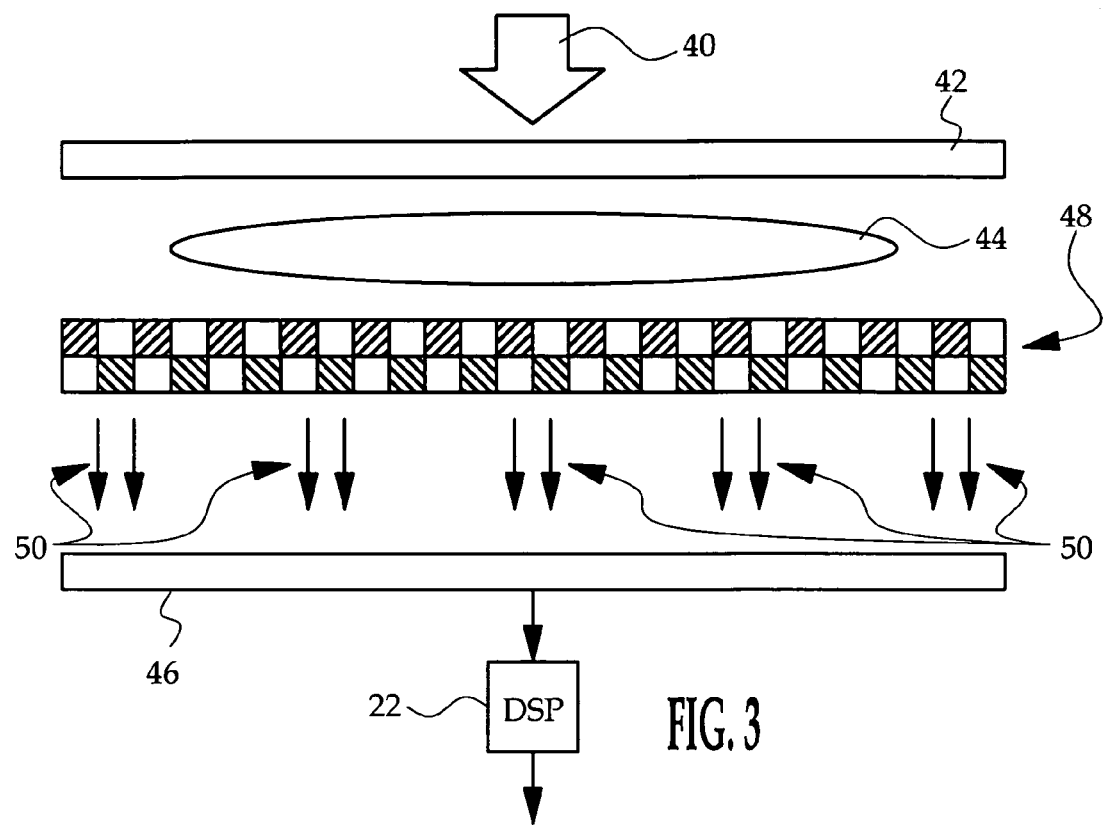
FIG. 3 is a diagram of an implementation of this invention.
Figure 4:
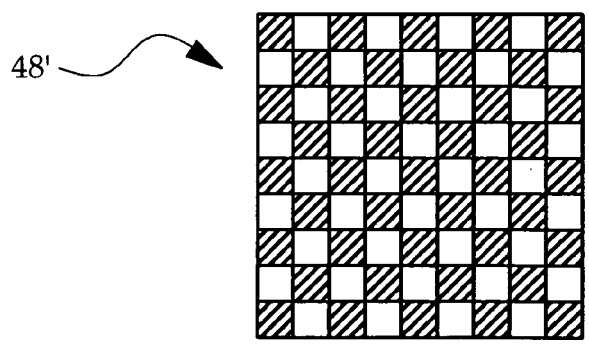
FIG. 4 is a diagram of a spectral filter array depicted in FIG. 3.

Referring to FIGS. 3-4, the combined ambient and active reflected light incident on the digital camera 20 is depicted by the arrow 40. This light is first passed through a visible cut filter 42 that removes all visible light while passing ambient and active near-infrared light. An imaging lens 44 focuses the filtered light on the image plane of the video chip 46, and a spectral filter array 48 disposed between imaging lens 44 and video chip 46 splits the incident light into primary and secondary channels, with primary and secondary channel components being focused on interlaced arrays of pixels comprising the video chip 46, as designated by the arrow pairs 50. In practice, the spectral filter array 48 will typically be formed on the video chip 46, as depicted by the array 48' of FIG. 4. The primary and secondary pixels do not necessarily need to be matched in size or even resolution. The DSP 22 separately captures the pixel intensities associated with the primary and secondary channels, and then carries out the processing steps depicted in the flow diagram of FIG. 2 to render a video image in which the effects of ambient lighting are substantially eliminated.

Mathematically, the intensities $I_p$ and $I_s$ of the primary and secondary channel pixels are given by:

$$I_p = \int \sigma_a(\lambda)\Phi_P(\lambda)d\lambda + \int \sigma_{led}(\lambda)\Phi_P(\lambda)d\lambda \qquad (1)$$

$$I_s = \int \sigma_a(\lambda)\Phi_S(\lambda)d\lambda + \int \sigma_{led}(\lambda)\Phi_S(\lambda)d\lambda. \qquad (2)$$

where $\sigma_a$ is the ambient spectrum, $\sigma_{led}$ is the active lighting spectrum, and $\Phi_P$ and $\Phi_S$ are the spectral transmissions of the primary and secondary filter elements of spectral filter array 48. For purposes of brevity, the spectral responsivity of the sensor itself has been imputed to the spectral filter transmission. The ambient compensated output image is given by:

$$I = \int \sigma_a(\lambda)\Phi_P(\lambda)d\lambda + \int \sigma_{led}(\lambda)\Phi_P(\lambda)d\lambda - \qquad (3)$$
$$C \cdot \left[ \int \sigma_a(\lambda)\Phi_S(\lambda)d\lambda + \int \sigma_{led}(\lambda)\Phi_S(\lambda)d\lambda \right]$$

where C is a correlation constant relating ambient content of the primary and secondary channels. The correlation constant C can be expressed as:

$$C = \frac{\int \sigma_a(\lambda)\Phi_P(\lambda)d\lambda}{\int \sigma_a(\lambda)\Phi_S(\lambda)d\lambda + \int \sigma_{led}(\lambda)\Phi_S(\lambda)d\lambda}. \qquad (4)$$

since the ambient compensated output image I can also be expressed as $\int \sigma_{led}(\lambda)\Phi_P(\lambda)d\lambda$. However, the equation for correlation constant C (i.e. equation (4)) is linked to both the differential spectral reflectance correlation and bleeding of the active light source into the secondary channel. As described above, these phenomena are separately addressed according to this invention by identifying a correlation factor (referred to here as C1) based on the differential spectral reflectance correlation and a correction factor (referred to here as C2) based on bleeding of the active light source into the secondary channel. The correlation factor C1 is given by:

$$C1 = \frac{\int \sigma_a(\lambda)\Phi_P(\lambda)d\lambda}{\int \sigma_a(\lambda)\Phi_S(\lambda)d\lambda} \qquad (5)$$

whereas the correction factor C2 is given by:

$$C2 = \frac{\int \sigma_{led}(\lambda)\Phi_P(\lambda)d\lambda}{\int \sigma_{led}(\lambda)\Phi_P(\lambda)d\lambda + C1 \cdot \int \sigma_{led}(\lambda)\Phi_S(\lambda)d\lambda} \quad (6)$$

These factors C1 and C2 are applied as:

$$\frac{I}{C2} = \int \sigma_a(\lambda)\Phi_P(\lambda)d\lambda + \int \sigma_{led}(\lambda)\Phi_P(\lambda)d\lambda - \quad (7)$$
$$C1 \cdot \left[ \int \sigma_a(\lambda)\Phi_S(\lambda)d\lambda + \int \sigma_{led}(\lambda)\Phi_S(\lambda)d\lambda \right]$$

The correlation factor C1 and correction factor C2 for a given environment and vision system can be readily determined by comparing images produced under lighting conditions corresponding to the primary and secondary image channels. The factors C1 and C2 are varied, and their values which produce the least mean square error between an image produced solely with the active lighting and a similar image produced with both ambient and active lighting are identified and stored as calibration values.

In summary, the present invention provides a way of cost effectively minimizing the effects of ambient lighting in an environment illuminated by both ambient and active sources without significantly impacting the vision system's maximum frame rate. While the present invention has been described with respect to the illustrated embodiment, it will be recognized that the invention can be utilized in other applications, including interior security cameras subject to interference by sunlight through windows, forward looking automotive cameras subject to interference by oncoming headlights or streetlights, cameras designed for backup aid, and so forth. Also, it is expected that numerous modifications and variations in addition to those mentioned herein will occur to those skilled in the art. For example, the invention may be implemented with a CMOS pixel structure that subtracts the scaled secondary pixel channel from the primary pixel channel during the charge integration process rather than after integration has been completed and the charge has been read. Such an implementation prevents saturation of the pixels due to high intensity ambient illumination, allowing the full dynamic range of the pixels to be applied to the active illumination. Accordingly, it is intended that the invention not be limited to the disclosed embodiment, but that it have the full scope permitted by the language of the following claims.

The invention claimed is:

1. A method of operation for a vision system including an imaging chip that produces digital images based on incident light from scene in an environment subject to ambient illumination, the method comprising the steps of:
   actively illuminating the environment with light in a spectrum encompassed by the ambient illumination;
   capturing a primary digital image produced by pixels of said imaging chip that are responsive to portions of the incident light in a primary spectrum that encompasses both active and ambient illumination, and a secondary digital image produced by pixels of said imaging chip that are responsive to portions of the incident light in a secondary spectrum that encompasses only ambient illumination;
   scaling the secondary digital image with a correlation factor based on a differential spectral reflectance of said ambient illumination between said primary and secondary spectra to determine what portion of the primary digital image is due to the ambient illumination; and
   subtracting the scaled secondary digital image from the primary digital image to form an ambient-compensated digital image of said scene.

2. The method of claim 1, including the step of:
   spectrally filtering light directed toward said imaging chip into primary and secondary channels, where the primary channel includes light in the primary spectrum and the secondary channel includes light in the secondary spectrum.

3. The method of claim 2, including the step of:
   scaling said ambient-compensated digital image with a correction factor that compensates for spectral filter bleeding between said primary and secondary channels.

4. The method of claim 3, including the steps of:
   determining and storing calibration values of said correlation factor and said correction factor for said environment; and
   retrieving said stored calibration values to scale said secondary digital image and said ambient-compensated digital image.

5. Apparatus for producing ambient-compensated digital images of a scene in an environment subject to ambient illumination, comprising:
   an active light source for producing active illumination of the environment with light in a spectrum encompassed by the ambient illumination;
   an imaging chip for producing a digital image in response to incident light;
   a spectral filter array for filtering said incident light into primary and secondary channels, where the primary channel includes light in a primary spectrum that encompasses both the active illumination and the ambient illumination, and the secondary spectrum includes light in a secondary spectrum that encompasses only the ambient illumination; and
   processing means for forming an ambient compensated digital image by separately capturing pixels of said digital image associated with said primary and secondary channels, scaling the pixels associated with said secondary channel with a previously determined correlation factor representative of a differential spectral reflectance of said ambient illumination between said primary and secondary spectra, and subtracting the scaled pixels from the pixels associated with said primary channel.

6. The apparatus of claim 5, including a lens for focusing the incident light on the imaging chip, said spectral filter array being disposed between said lens and said imaging chip.

7. The apparatus of claim 5, where said spectral filter array bandpass filters the incident light into a primary wavelength band that encompasses both the active illumination and the ambient illumination, and a secondary wavelength band that encompasses only the ambient illumination.

8. The apparatus of claim 5, where said spectral filter array notch filters the active illumination out of the secondary channel.

9. The apparatus of claim 5, where said spectral filter array edge filters the incident light into a primary spectrum that encompasses both the active illumination and the ambient illumination, and a secondary spectrum that encompasses only the ambient illumination.

10. The apparatus of claim 5, where the imaging chip carries out a charge integration process to produce the digital image, and the processing means subtracts the scaled secondary pixels from the pixels of the primary channel during the charge integration process of primary channel pixels to prevent saturation of the primary channel pixels by the ambient illumination.

* * * * *